Dec. 10, 1968  T. G. FAULKNER  3,415,365
WAX COATED DISC-PROTECTING AND STORAGE DEVICE
Filed Dec. 29, 1966

INVENTOR.
THOMAS G. FAULKNER
BY
William C. Babcock
ATTORNEY

United States Patent Office 3,415,365
Patented Dec. 10, 1968

3,415,365
WAX COATED DISC-PROTECTING AND STORAGE DEVICE
Thomas G. Faulkner, 10910 Lillian Lane, South Gate, Calif. 90280
Filed Dec. 29, 1966, Ser. No. 605,859
3 Claims. (Cl. 206—62)

ABSTRACT OF THE DISCLOSURE

A moisture-proof device for storing a supply of wax coated paper discs of the type used on Tachograph units in the cab of an automotive truck or tractor in such a manner that said wax coatings are not defaced due to frictional contact between the discs caused by vibration and shock from said vehicle when the latter is in motion.

In the trucking industry it is common present-day practice to equip trucks or tractors used on long hauls with such recording devices as a Tachograph, which records the revolutions per minute of the engine, the time intervals during which the vehicle is moving or stationary, as well as the speed at which the vehicle is driven. The information derived from this record is vital to the owner or operator of the vehicle in that it indicates whether the vehicle is being abused during operation thereof, and also is a guide as to the efficiency with which it is operated.

Recording devices like a Tachograph, or the like, are paper discs and include an external white wax layer overlying a soft intermediate darker layer that is bonded to the paper disc. A wax-coated paper disc is adapted to be removably mounted on a Tachograph (trademark) and slowly rotated at a uniform rate thereby. As the disc is rotated, it is pressure-contacted by styluses which move over the surface thereof in response to the rate at which the vehicle in which it is installed is driven and the revolutions per minute of the engine of the automotive vehicle. As the disc rotates, the styluses scrape away portions of the wax layers on the disc to expose the dark under surface thereof, whereby continuous dark curves are visible against the graduated wax layer to indicate the conditions under which the vehicle has been operated.

As described, each graduated disc mounted on a Tachograph, or similar recording instrument, rotates once in twenty-four hours within a twenty-four-hour period. During a long haul, a truck or tractor will normally travel for days at a time. Under such conditions an adequate supply of said discs must be carried on the truck or tractor to permit replacement of new discs on the Tachograph, or other recording device, as required at the expiration of each twenty-four hour period. The discs of the type described herein are usually supplied in cartons which are carried in the particular truck or trailer. The packaged discs are subjected to vibration of the truck or tractor during such travel, and frictionally move one against another as a result thereof. This relative movement of the discs is frequently severe enough to cause the outer wax layer thereof to become worn through and expose portions of the black layer lying thereunder. Use of such defaced discs to ascertain the operating conditions of a vehicle during a long trip is greatly impaired, for as the styluses pass over blackened areas they will not produce curves which can be read with any accuracy.

A major object of the present invention is to provide a container for a supply of paper discs, on one surface of which graduated wax layer have been applied, in such a manner that these layers will not be scratched, marred or defaced when the container and discs therein are subjected to vibration and shock such as commonly occurs during transportation thereof in the cab of a truck or tractor.

Another object of the invention is to furnish a container for discs on which wax layers have been applied that can be secured to the interior of a truck or tractor cab within convenient reach of the driver, which container will protect the discs an a moisture-proof condition against damage from vibration of the vehicle.

A still further object of the invention is to supply a container for paper discs of the type described that can be fabricated from standard, commercially available materials, which is simply and sturdy in structure, requires no elaborate plant facilities for its production, and can be retailed at a sufficiently low price as to encourage the widespread use thereof.

These and other objects and advantages of the invention will become apparent from the following description of a preferred form thereof, and from the accompanying drawing illustrating the same, in which.

Figure 1:
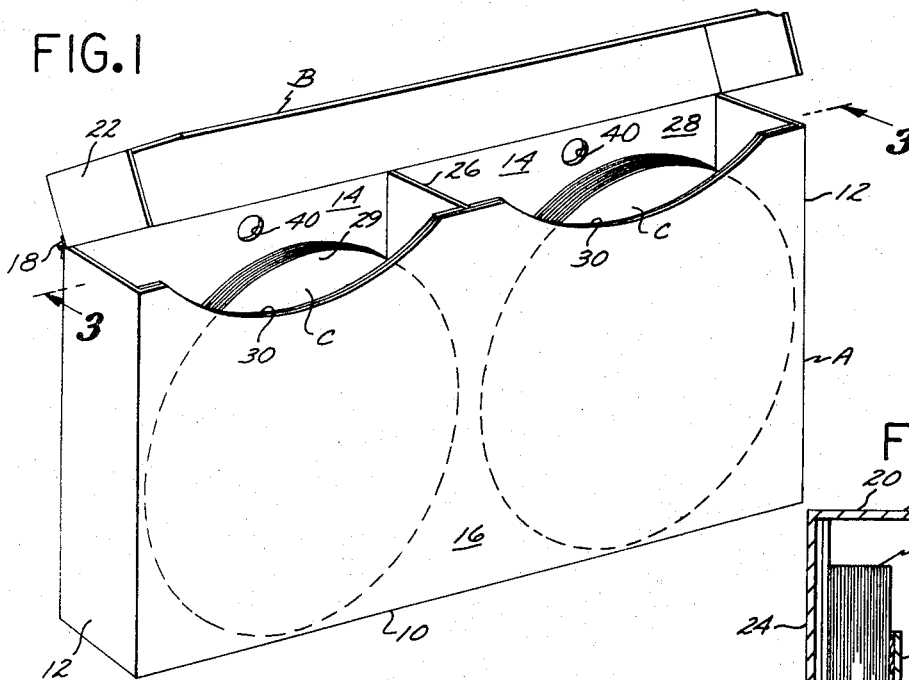
FIGURE 1 is a front perspective view of the device, with the top thereof in a partially open position.
Figure 4:
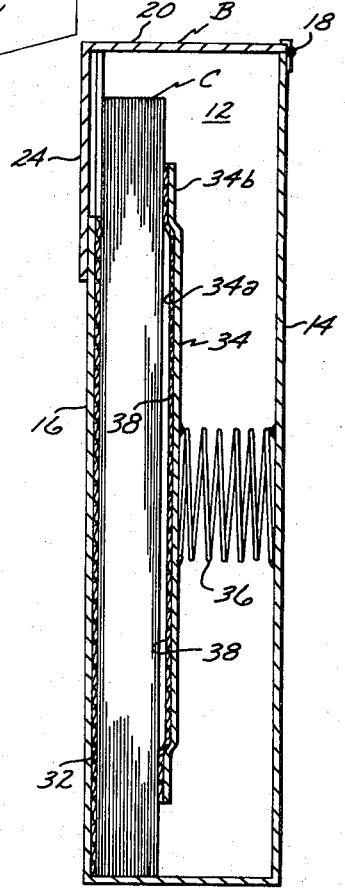
FIGURE 4 is a transverse cross-sectional view of the container, taken on the line 4—4 of FIGURE 2.

With continued reference to the drawing for the general arrangement of the invention, it will be seen in FIGURE 1 to include a relatively narrow box A comprising a bottom 10, two end walls 12, a rear side wall 14, and a forward side wall 16. Conventional hinges 18 are mounted on the upper portion of side wall 14 and pivotally support a cover B comprising a rectangular section 20, the rear edge portion of which is secured to the hinges. Two end flanges 22 and a forward flange 24 (FIGURE 4) depend from section 20, and are adapted to overlap the end walls 12 and forward side wall 16 when the cover B is in the closed position illuustrated in FIGURE 4.

A transverse partition is provided in the center of box A that cooperates with the bottom 10, end walls 12, and side walls 14 and 16 to define two compartments 28, which in length and in depth are slightly greater than that of the paper discs C to be stored therein. The discs C are of paper, and as previously mentioned, each includes a white wax layer 29 on one side thereof on which appropriate graduations (not shown) are printed. The wax layer 29 overlies a dark layer (not shown) that is bonded to the paper disc. Two longitudinally spaced recesses 30 are formed in the forward side wall 16 to permit a disc C in box A to be easily grasped between the thumb and forefinger and removed therefrom when the cover B is in the open position. The major portion of the interior surface of forward side wall 16 is covered by two layers of felt 32, or a like soft sheet material that will not deface one of the layers 29 when in pressure contact therewith.

Two pressure plates 34 are provided that are preferably smaller in diameter than that of discs C. Two helical springs 36 are affixed to the forward face of rear side walls 14 by welding or the like, and the plates 34 are secured to the forward ends thereof. The springs 36 are at all times under compression, and are of such length that when no discs C are situated in compartments 28, the plates 34 are in pressure contact with sheet material 32.

Dished center portions 34a are preferably formed in plates 34 and rim surfaces 34b of these plates extend therefrom. A layer 38 of soft resilient material such as felt is adhered to the dished center portion 34a and rim surface 34b of each plate 34. Due to the structure just described, it will be seen that only the rim 34b of a plate 34 exerts pressure on the discs C through layer 38. Several spaced openings 40 are formed in rear side wall 14 through which conventional fasteners (not shown) can extend to secure the box A to a convenient portion of the cab structure (not shown) of a truck or tractor.

Figure 2:
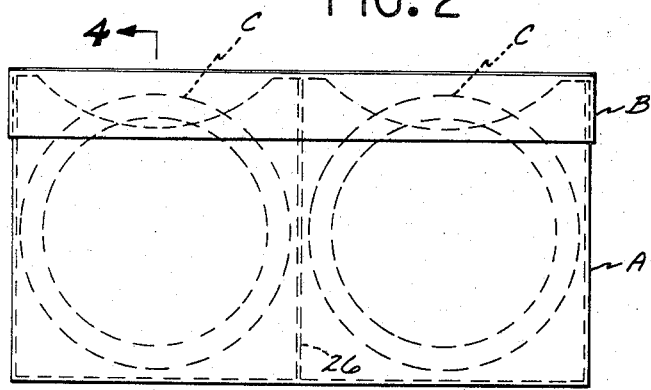
FIGURE 2 is a front elevational view of the container, with the top in a closed position.
Figure 3:
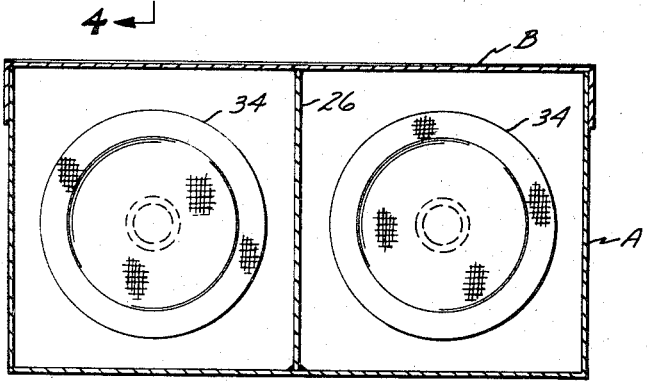
FIGURE 3 is a longitudinal, cross-sectional view of the container, taken on the line 3—3 of FIGURE 1.

Operation of the invention is most simple. Initially, the box A is mounted in a convenient location in the cab of the vehicle on which it is to be used. A stock of discs C in at least sufficient quantity to last for the duration of a trip, are then disposed in box A, and with sufficient pressure being exerted thereon by plates 34 to prevent any tendency thereof to move relative to one another. Thereafter, cover B is moved into a closed position (FIGURES 2 and 4 inclusive) to protect the discs out of contact with the elements and the like. Periodically during progress of the trip, the cover B is opened and discs C removed from box A to be mounted on a Tachograph or other recording equipment with which the truck or tractor is equipped, and the cover B then closed to protect the discs remaining therein.

Although the present invention is fully capable of achieving the objects and providing the advantages hereinbefore mentioned, it is to be understood that it is merely illustrative of the presently preferred embodiments thereof.

I claim:

1. A moisture-proof device for use in storing a plurality of wax coated paper discs of the type used on a Tachograph in the cab of an automotive truck in a position therein that can be conveniently reached by the driver of said vehicle when in a driving position, which device includes:
   (a) a narrow rectangular box comprising a bottom, two end walls, a rear, and a forward side wall that extend upwardly from said bottom, the dimensions of which box are such as to permit said box to hold at least one stack of said discs, with said forward side wall having at least one downwardly extending recess formed in the upper portion thereof, each of which recesses are in transverse alignment with one of said stacks and extend downwardly below the upper portion thereof to permit an upper circumferential edge portion of one of said discs to be grasped and readily removed from said box by said driver;
   (b) a cover movably supported on the upper portion of said box, which cover when in a closed position extends downwardly over said recess to protect said stack of discs against moisture;
   (c) first and second resilient layers that cover the adjacent interior surfaces of said forward and rear side walls;
   (d) a dished pressure plate disposed in said box parallel to said stack of discs, which plate includes a projecting circumferential portion which pressure contacts the circumferential surface portion of the rearmost of said discs;
   (e) spring means in said box that at all times tend to press said plate towards one of said resilient layers with sufficient force to prevent relative movement between said discs when said box is subjected to vibration and shock from said vehicle during travel thereof; and
   (f) means for supporting said box in said cab of said automotive truck.

2. A device as defined in claim 1 wherein said spring means comprises a compressed helical spring that extends between the central portion of said pressure plate and the interior surface of one of said side walls.

3. A device as defined in claim 1 which further includes:
   (g) at least one transverse partition that divides the interior of said box into a plurality of compartments, with each of said compartments being of such size as to hold one of said stacks of discs.

References Cited

UNITED STATES PATENTS

| | | | |
|---|---|---|---|
| 1,535,997 | 4/1925 | Halansky | 206—39 |
| 2,056,279 | 10/1936 | Kulick | 206—39 |
| 2,163,828 | 6/1939 | Chalmers | 229—27 |
| 2,943,733 | 7/1960 | Poeschl et al. | 206—62 |
| 3,109,694 | 11/1963 | Mullins et al. | 346—137 |

WILLIAM T. DIXSON, JR., *Primary Examiner.*

U.S. Cl. X.R.

346—137